United States Patent
Ferchland et al.

(10) Patent No.: US 8,615,012 B2
(45) Date of Patent: Dec. 24, 2013

(54) CIRCUIT AND METHOD FOR OPERATING A NODE IN A RADIO NETWORK

(75) Inventors: Tilo Ferchland, Dresden (DE); Soeren Schneider, Dresden (DE); Udo Walter, Dresden (DE)

(73) Assignee: Atmel Corporation, San Jose, CA (US)

( * ) Notice: Subject to any disclaimer, the term of this patent is extended or adjusted under 35 U.S.C. 154(b) by 465 days.

(21) Appl. No.: 12/818,907

(22) Filed: Jun. 18, 2010

(65) Prior Publication Data
US 2010/0322121 A1 Dec. 23, 2010

Related U.S. Application Data

(60) Provisional application No. 61/218,225, filed on Jun. 18, 2009.

(30) Foreign Application Priority Data

Jun. 18, 2009 (DE) .......................... 10 2009 029 783

(51) Int. Cl.
*H04L 12/28* (2006.01)
(52) U.S. Cl.
USPC ......... 370/395.3; 370/328; 370/338; 370/503
(58) Field of Classification Search
USPC .............. 370/310, 349, 350, 328, 338, 395.3, 370/503; 455/574; 702/188
See application file for complete search history.

(56) References Cited

U.S. PATENT DOCUMENTS

| | | | |
|---|---|---|---|
| 7,257,095 B2* | 8/2007 | Liu | 370/311 |
| 7,710,939 B2* | 5/2010 | Shao et al. | 370/349 |
| 2003/0050104 A1* | 3/2003 | Matsumura et al. | 455/574 |
| 2004/0102931 A1* | 5/2004 | Ellis et al. | 702/188 |
| 2005/0122921 A1* | 6/2005 | Seo | 370/310 |

FOREIGN PATENT DOCUMENTS

DE 19952840 A1 5/2001

OTHER PUBLICATIONS

Office Action and English Translation of German Patent Application 10 2009 029 783.9, Feb. 27, 2012.

* cited by examiner

*Primary Examiner* — Christopher Grey
(74) *Attorney, Agent, or Firm* — Baker Botts LLP

(57) ABSTRACT

A circuit and a method for operating a node in a radio network, whereby nodes of the same radio network have a common network ID and each node individually is assigned a node ID, wherein during the reception of a current packet by a receiving circuit of the node, an address contained in the packet is determined, wherein reception of the current packet is continued when the determined address agrees with the network ID of the node and the node ID of the node, and wherein during reception of the current packet, the reception of the current packet is terminated and the receiving circuit is controlled based on a case decision, when the determined address does not agree with the network ID of the node or the node ID of the node.

15 Claims, 3 Drawing Sheets

CIRCUIT AND METHOD FOR OPERATING A NODE IN A RADIO NETWORK

This nonprovisional application claims priority to German Patent Application No. DE 10 2009 029 783.9, which was filed in Germany on Jun. 18, 2009, and to U.S. Provisional Application No. 61/218,225, which was filed on Jun. 18, 2009, and which are both herein incorporated by reference.

BACKGROUND OF THE INVENTION

1. Field of the Invention

The present invention relates to a circuit of a node in a radio network and a method for operating a node in a radio network.

2. Description of the Background Art

A radio network is defined in the industry standard IEEE 802.15.4-2006. In this regard, on pages 21 to 23 in the standard, packets to be transmitted by radio are defined, which may contain different frames, such as, for example, a so-called beacon frame, a data frame, an acknowledgement frame, or a MAC command frame.

SUMMARY OF THE INVENTION

It is therefore an object of the present invention to improve a method for operating a node in a radio network as much as possible. Accordingly, a method for operating a node in a radio network is provided. Nodes of the same radio network are assigned a common network identification code (network ID). Each node individually is assigned, in addition, a node identification code (node ID).

In the method, during reception of a current packet by a receiving circuit of the node, an address contained in the packet is determined.

The reception of the current packet can be continued, when the determined address agrees with the network ID of the node and the node ID of the node. If the packet can be received completely, the content of a frame of the packet can be evaluated by an arithmetic unit by means of software implemented in the arithmetic unit.

During reception of the current packet, the reception of the current packet is terminated and the receiving circuit is controlled based on a case decision, when the determined address does not agree with the network ID of the node or the node ID of the node. The case decision occurs preferably as a function of the determined address.

The invention has as its object, further, to provide as improved a circuit as possible. Accordingly, a circuit of a node is provided, which is used in a radio network. Nodes of the same radio network are assigned a common network ID. Each node of the radio network individually is assigned, in addition, a node ID.

The circuit has an analog/digital receiving circuit for receiving a current packet. The receiving circuit has a control input for controlling the reception. For example, the receiving circuit can be turned on and off by a control signal at the control input. For this purpose, the receiving circuit has, for example, a number of switching elements, which are connected to a supply voltage. For the reception, the receiving circuit is formed, for example, for downmixing, for demodulation, and for correlation of a receive signal.

The circuit has a digital evaluation circuit, which is connected to the control input of the receiving circuit for controlling the reception. The evaluation circuit can have a logic, particularly a state machine, which performs functions of the evaluation circuit, for example, the control of the receiving circuit by outputting a control signal.

The evaluation circuit can be set up to determine an address contained in the packet, even while the current packet is being received. To determine the address, the evaluation circuit can read, for example, information from address fields within the packet.

The receiving circuit and the evaluation circuit can be set up to continue to receive the current packet, when the determined address agrees with the network ID of the node and the node ID of the node. Preferably, during or after the determining of the agreement, an arithmetic unit is awakened, which starts a program run to evaluate the information in a frame of the received packet.

The evaluation circuit can be set up to control the receiving circuit before complete reception of the current packet to terminate the reception of the current packet, when the determined address does not agree with the network ID of the node or the node ID of the node.

The embodiments described hereinafter refer to both the method and the circuit. The functions of the circuit can be derived hereby from the method features.

According to an embodiment, the receiving circuit can be turned off to terminate the reception of the current packet during transmission of the packet, optionally, to another node. The turning off of the receiving circuit occurs when according to the case decision the determined address agrees with the network ID but not with the node ID. In this case, the packet is intended for another node of the same radio network.

In another embodiment, it is provided that an OFF time can be computed based on the information contained in the packet. Preferably, the information is assigned to the data length of a frame of the packet. Preferably, the OFF time is computed based on a packet transmission rate. According to an embodiment, the receiving circuit is turned on for reception with the end of the OFF time.

According to an embodiment, the OFF time can be computed in addition based on information, contained in the packet, on an acknowledgment. The acknowledgement can also be called a confirmation. The OFF time in the case of the acknowledgment is computed based on a time point of a sending back of the acknowledgment. Preferably, the OFF time is limited by a maximum value. Preferably, the time point of sending back the acknowledgment in the radio network is defined and therefore known. For example, the time interval between the end of the packet and the time point of sending back the acknowledgment is established at the system level.

When the reception of the current frame is terminated, an arithmetic unit, particularly a microcontroller, of the node is not awakened when the specific address does not agree with the node ID of the node.

According to an embodiment, synchronization parameters of the receiving circuit for terminating the reception of the current packet are cleared, in order to begin a synchronization to a new preamble of the particular radio network during the transmission of the packet in another radio network. The synchronization parameters of the receiving circuit are therefore cleared during the transmission of the packet, when according to the case decision the determined address does not agree with the network ID of the node.

Further, the reception energy of the current packet with the non-conforming network ID can be determined. Based on the determined reception energy, preferably an upper threshold and/or a lower threshold are determined. Preferably, the upper threshold is at a distance from the determined reception energy. Preferably, the lower threshold is at a distance from the determined reception energy.

After the determination of the reception energy, synchronization to a new preamble can be started, when the current reception energy in the transmission channel exceeds the upper threshold or falls below the lower threshold. If the reception in the transmission channel exceeds the upper threshold, only minor interferences with the signal of the foreign radio network are to be expected. If the reception energy in the transmission channel falls below the lower threshold, the probability is high that a sender in the particular radio network is able to receive—during a transmission pause of the sender from the foreign network. Alternatively, a time counter can also be used for determining the time length of the packet with a non-conforming network ID. In this case, the synchronization to a new preamble is started with the termination of the time counter.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
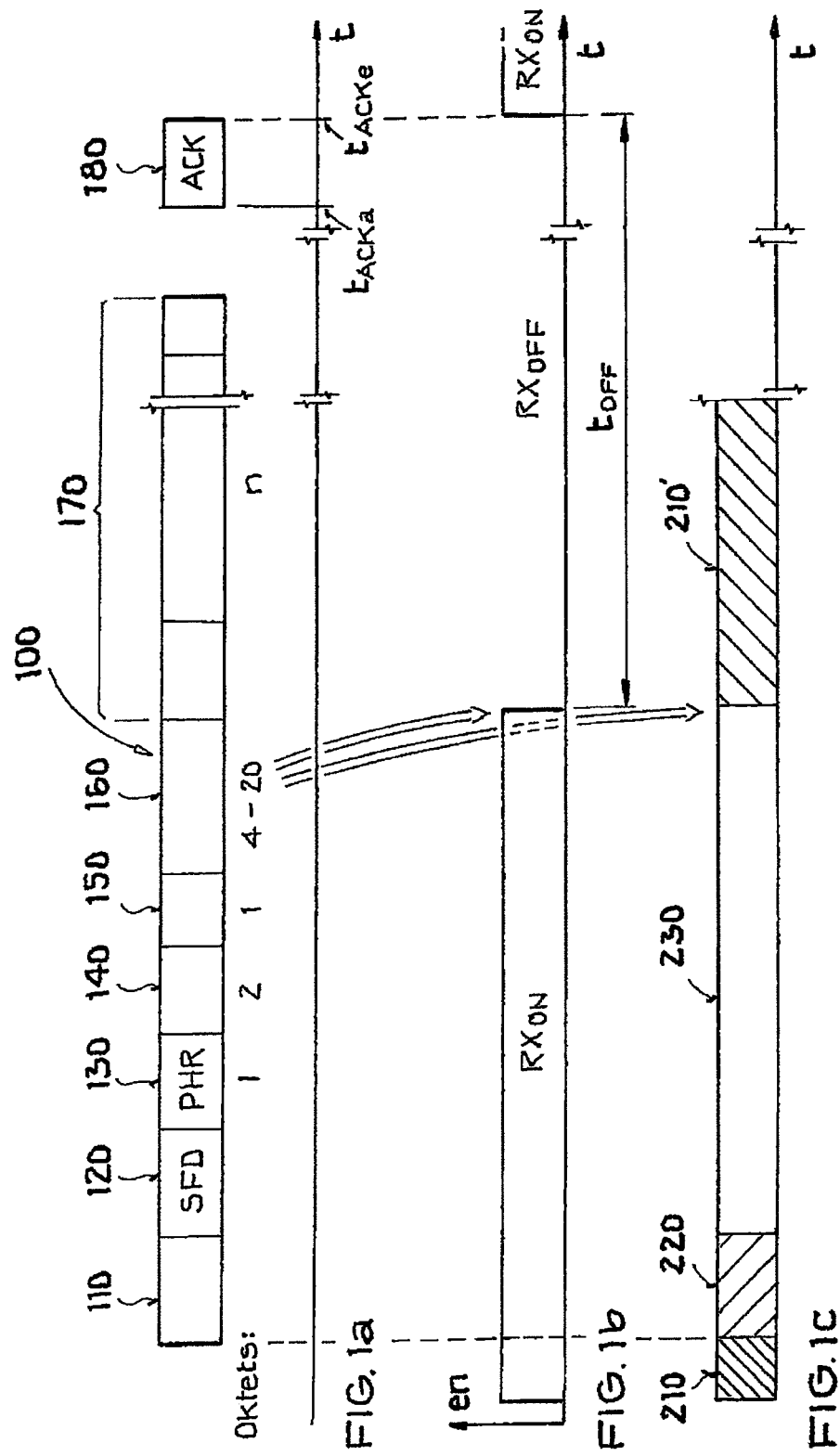
FIG. 1a shows a schematic illustration of a packet.
FIG. 1b shows a schematic illustration of a control signal.
FIG. 1c shows a schematic illustration of reception states.

In FIG. 1, a packet 100 is shown schematically, as it is transmitted in a radio network. Packet 100 has a frame with the fields 140, 150, 160, and 170. The transmission of packet 100 is depicted over the time t. In this regard, a preamble 110 is transmitted first, then a start field 120 (SFD, start of frame delimiter), followed by a packet header 130 (PHR, PHY HeadeR) with the information on frame length, and then a frame with the fields 140, 150, 160, and 170.

The illustration in FIG. 1a is exemplary for a packet 100 with a data frame of the industry standard IEEE 802.15.4. The data frame has a frame control field 140 (frame control), a sequence number 150, an address 160 (addressing fields), and other fields 170 with useful data with a number of n octets. The useful data in this regard typically make up the overwhelming part of the data frame.

Figure 3:
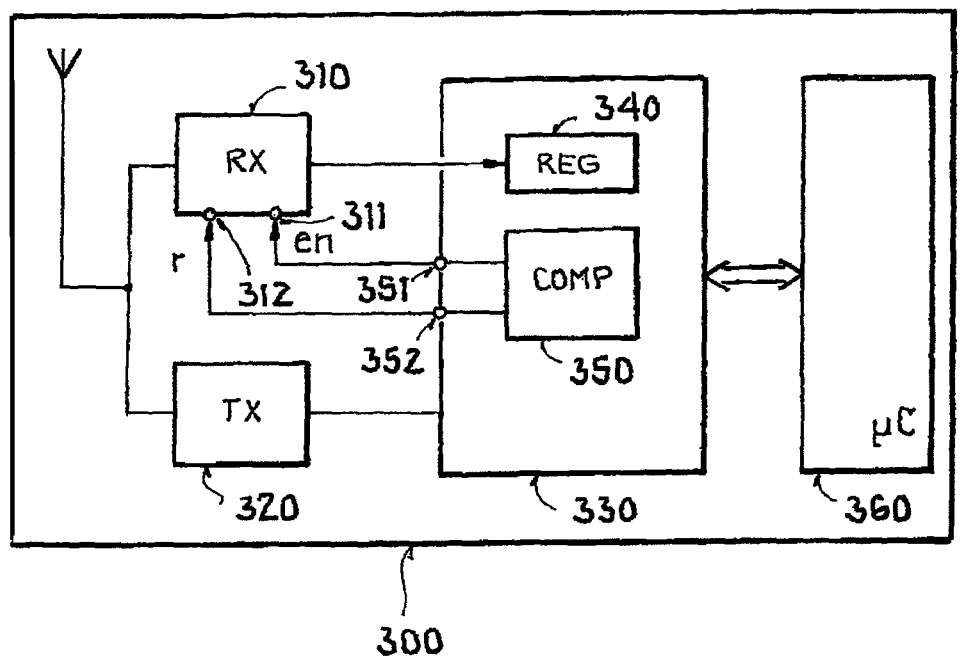
FIG. 3 shows a schematic block diagram of a circuit.

It is necessary for the method described below that packet 100 contains an address 160. The address 160 contains a first component which enables assignment to the network. For this purpose, for example, the first component of the address 160 is compared with a network ID NWID stored in the node (FIG. 3). The address 160 contains a second component which enables assignment to precisely one node. For this purpose, for example, the second component of the address 160 of packet 100 is compared with a node ID KNID stored in the node (FIG. 3). The network ID NWID and the node ID KNID in this regard form a unique identification by means of which precisely one node in the radio network is identifiable.

The industry standard IEEE 802.15.4, further, defines packets with a beacon frame, an acknowledgment frame, and a MAC command frame. A part of the defined frame requires an acknowledgment 180 (ACK, ACKnowledgement) of reception from a receiver. The acknowledgment 180, as shown in FIG. 1a, is sent back to the sender by the recipient of the frame between the time points tACKa and tACKb. Other packets of other industry standard, such as WLAN, Bluetooth, or WiMax, can have a different structure, for example, with another sequence of fields, but are also defined with an address.

It will be assumed below that the node for reception of information is activated. To this end, a receiver circuit 310, as it is shown in FIG. 3, is activated by turning on a control signal en, as shown in FIG. 1b, by means of a high level of receiver circuit 310. A reception status of a receiving node is thereby controlled in an ON state RXON.

In the ON state RXON a search phase 210 begins, as it is shown in FIG. 1c, whereby the receiver circuit attempts to synchronize to a receive signal. With the reception of preamble 110 of packet 100, the receiving circuit performs a frequency estimation. Synchronization parameters, such as phase, timing, or offset, are determined. For further reception, the synchronization parameters are frozen. The preamble sequence 110 and the following start field 120 (SFD, start of frame delimiter) enable the receiving node to perform a symbol synchronization. The synchronized state defines a transmission phase 230 in which the fields 130, 140, 150, and 160 are received. In this regard, the length of the following frame (140, 150, 160, 170) is determined from the packet header 130.

During the reception of a current packet 100 by the receiving circuit 310 of the node, the address 160 contained in packet 100 is determined. Based on the address 160, a case differentiation is performed by the receiving node.

In a first case, reception of the current packet 100 by receiving circuit 310 is continued when the determined address 160 agrees with the network ID NWID of the node and the node ID KNID of the node. In this case, the packet is intended for the receiving node itself, so that fields 170 with the useful data are received and optionally evaluated by the node. For the evaluation, for example, an arithmetic unit 360 (FIG. 3), such as, for example, a microcontroller, is awakened.

If the determined address 160 does not agree with the network ID NWID of the node or the node ID KNID of the node, during the reception of the current packet 100, the reception of the current packet 100 is terminated by the node. The fields 170 are therefore no longer completely received by the node. Two possible cases, based on the determined address, are indicated by the arrows from the address 160 in FIG. 1a to FIGS. 1b and 1c. Receiving circuit 310 is controlled based on this case decision.

If according to the case decision, the determined address 160 agrees with the network ID NWID and, moreover, the address 160 does not agree with the node ID KNID, a response occurs which is shown in FIG. 1b. In this case, the receiving circuit 310 is turned off to terminate the reception of the current packet 100 during further transmission of packet 100. In connection with FIG. 1a, it is shown in FIG. 1b that a receive status of the receiving node changes from an ON state RXON to an OFF state RXOFF. By way of example, a control signal en is shown, which depending on the determined address 160 during the transmission of packet 100 turns off the receiver circuit 310 of the node by a low level. A receive status of the receiving node is thereby controlled in an OFF state RXOFF.

An OFF time tOFF, during which receiving circuit 310 is turned off, can be provided, for example, as a fixed value. Preferably, the OFF time tOFF is computed by an evaluation circuit 330 (FIG. 3). The computing of the OFF time tOFF occurs based on the frame length which is defined in the packet header 130. In addition, the computing of the OFF time tOFF occurs optionally, but preferably based on the transmission rate, provided it can be changed in the radio network. In addition, the computation of the OFF time tOFF occurs optionally but preferably based on information contained in the frame on whether an acknowledgment 180 is to be sent back by the recipient.

By means of this exemplary embodiment according to FIG. 1b, the significant advantage is achieved that during the OFF time tOFF, the current uptake by receiving circuit 310 is substantially reduced. Because the length of fields 170 in packet 100 predominates by far, the average current uptake can be considerably reduced, so that a battery lifetime of a battery-operated node is increased. The time interval between the transmission time point of the acknowledgement 180 to the end of packet 100 is established at the system level. If the OFF time tOFF is therefore computed at a time point tACKe to the end of the acknowledgment 180, the current consumption can be reduced further.

If according to the case decision, the determined address 160 does not agree with the network ID NWID, a response occurs which is shown in FIG. 1c. In this case, synchronization parameters, such as phase, timing, or frequency offset, of the receiving circuit 310 are cleared during the transmission of packet 100, which causes a termination of the reception of packet 100. For synchronization to a new (particularly network-specific) preamble (not shown in FIGS. 1a, 1b, and 1c), which is transmitted concurrently during the transmission of the packet in another network, the search phase 210' is restarted.

Synchronization to a new preamble can occur because of the clearing of old synchronization parameters while the packet of the foreign network is still being received. This has the surprising effect that the node with the synchronization to a preamble of a packet from a foreign network is not blind to the transmissions, started in the interim in its own radio network, for the entire duration of transmission of the packet of the foreign network. The availability of the nodes in the particular radio network for transmission is hereby significantly increased.

Figure 2:
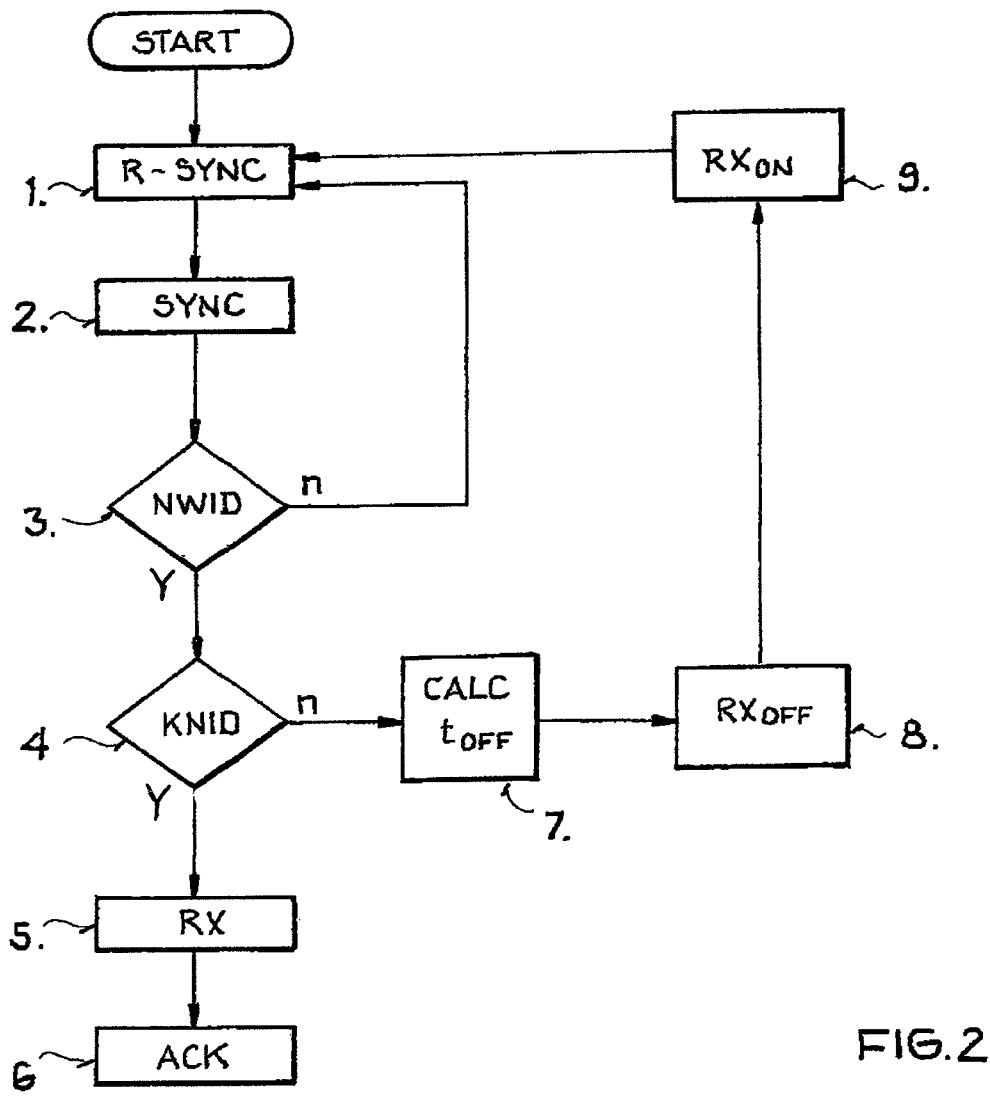
FIG. 2 shows a schematic flowchart.

A schematic flowchart for a case decision is shown schematically in FIG. 2. After a node is started for reception, in a first process step 1 synchronization parameters for reception are reset (R-SYNC). In a second step, synchronization 220, SYNC, to a received preamble 110 and the reception of a start field 120, a packet header 130, and possibly other fields 140, 150, and an address 160 take place. A component of the address 160 is compared in step 3 with a network ID NWID. If the address 160 and the network ID NWID do not agree, the synchronization parameters are again cleared in step 1.

If the address 160 and the network ID NWID agree, in step 4 a component of the address 160 is compared with a node ID KNID. If the address 160 and the node ID KNID do not agree, in step 7 an OFF time tOFF is computed, a timer with the OFF time is started, and a receiving circuit 310 (FIG. 3) in step 8 is placed in an OFF state RXOFF. In the OFF state, the predominant portion of the node circuit is turned off. Only the timer needs to be supplied with current. After the timer is done, in step 9 the receiving circuit 310 is placed in an ON state RXON and in step 1 the synchronization parameters are again cleared.

If the address 160 and the node ID KNID agree, packet 100 is intended for the node itself and the node receives packet 100 in step 5. If the frame transmitted with packet 100 requires an acknowledgment, the acknowledgment ACK is sent back in step 6.

A schematic block diagram of a circuit 300 of a radio network node is shown in FIG. 3. In circuit 300, a network ID NWID is stored, which is the same for all nodes in the same radio network. In addition, in circuit 300 a node ID is stored which enables an individual identification for the node in the radio network.

The circuit has a receiving circuit 310 for receiving a current packet 100. The receiving circuit 310 is connected to an antenna for reception. The receiving circuit 310 has a first control input 311 and a second control input 312 to control the reception. Receiving circuit 310 can be turned on and off by means of a first control signal en via the first control input 311. Synchronization parameters can be cleared by means of a second control signal r via the second control input 312. Both control signals en and r in this regard can cause termination of the reception of the current packet.

The circuit furthermore has an evaluation circuit 330, which is connected via a number of control outputs 351, 352 to the first control input 311 and to the second control input 312 of receiving circuit 310 to control reception. The evaluation circuit 330 has a memory 340, for example, a register REG for storing information contained in packet 100. The evaluation circuit 330 is set up to determine an address 160, contained in packet 100, while the current packet 100 is being received. To determine the address and to control receiving circuit 310, evaluation circuit 310 has a logic, particularly a state machine, which is not shown in FIG. 3. The address, for example, is read out of the memory 340.

Further, evaluation circuit 330 is set up for a case decision. If the determined address 160 agrees with the network ID NWID of the node, stored in evaluation circuit 330, and the node ID KNID of the node, receiving circuit 310 and evaluation circuit 330 continue the reception of the current packet 100. Evaluation circuit 330 has a digital comparator 350 to check the agreement. Evaluation circuit 330 further has a connection to an arithmetic unit 360, for example, a microcontroller. If the comparison result is positive, arithmetic unit 360 is awakened.

If a data frame of the packet has been completely received, the data of the data frame are transferred from evaluation circuit 330 to arithmetic unit 360. Arithmetic unit 360 in this regard is formed to execute a program run of software implemented in arithmetic unit 360. The functions of the state machine in evaluation circuit 330 in so doing can be used independent of the execution of the software in arithmetic unit 360. In addition, evaluation circuit 330 transmits an acknowledgment ACK back to the sender of packet 100 via transmission circuit 320.

If the determined address 160 does not agree with the network ID NWID of the node or the node ID KNID of the node, evaluation circuit 330 is formed to terminate the reception of the current packet 100 by outputting a control signal en or r to receiving circuit 310. The control of receiving circuit 310 by evaluation circuit 330 occurs in this regard while current packet 100 is still being transmitted. Complete reception of current packet 100 does not occur in this case.

The invention is not limited to the shown embodiment variants of FIGS. 1a through 3. For example, it is possible to perform the comparison of the address with the network ID NWID and the node ID KNID at the same time. The functionality of the circuit according to FIG. 3 can be used especially advantageously for a radio network according to an industry standard, such WLAN or WiMax. Preferably, the function is used for a battery-operated node of a radio network according to the industry standard IEEE 802.15.4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a node in a radio network, the method comprising:
receiving, by a receiving circuit of a node, a first portion of a current packet, wherein the node is one of a plurality of nodes on a radio network that have a common network ID and an individual node ID;
examining the first portion of the current packet to identify an address contained in the current packet;
continuing reception of a second portion of the current packet if the identified address corresponds to the common network ID of the node and the individual node ID of the node,
terminating the reception of the second portion of the current packet if the identified address does not correspond to the common network ID of the node or the individual node ID of the node; and
in response to determining that the identified address does not correspond to the network ID of the node:
clearing one or more synchronization parameters of the receiving circuit;
synchronizing the receiving circuit to a new preamble;
determining a current reception energy of the current packet; and
based at least on the determined current reception energy, determining one or more of an upper threshold and a lower threshold,
wherein synchronizing the receiving circuit to the new preamble is initiated if the current reception energy in the transmission channel exceeds the upper threshold or falls below the lower threshold.

2. The method according to claim 1, further comprising terminating the reception of the second portion of the current packet if the identified address corresponds to the common network ID and does not correspond to the individual node ID.

3. The method according to claim 2, wherein reception is terminated for a length of time corresponding to a data length of a frame of the current packet, and the method further comprises continuing reception, by the receiving circuit, of at least a portion of a subsequent packet after the length of time expires.

4. The method according to claim 3, wherein the length of time is determined based at least in part on a transmission time of an acknowledgment to be transmitted by the node.

5. The method according to claim 3, wherein the length of time is limited by a maximum value.

6. A node in a radio network, the node comprising:
a receiving circuit configured to receive a first portion of a current packet, wherein the node is one of a plurality of nodes on a radio network that have a common network ID and an individual node ID; and
an evaluation circuit connectable to the receiving circuit and configured to:
examine the first portion of the current packet to identify an address contained in the current packet;
cause the receiving circuit to continue to receive a second portion of the current packet if the identified address corresponds to the common network ID of the node and the individual node ID of the node; and
cause the receiving circuit to terminate the reception of the second portion of the current packet if the identified address does not correspond to the common network ID of the node or the individual node ID of the node,
wherein the node is configured to, in response to determining that the identified address does not correspond to the network ID of the node:
clear one or more synchronization parameters of the receiving circuit;
synchronize the receiving circuit to a new preamble;
determine a current reception energy of the current packet; and
based at least on the determined current reception energy, determine one or more of an upper threshold and a lower threshold,
wherein synchronizing the receiving circuit to the new preamble is initiated if the current reception energy in the transmission channel exceeds the upper threshold or falls below the lower threshold.

7. The node according to claim 6, wherein the evaluation circuit is further configured to cause the receiving circuit to terminate the reception of the second portion of the current packet if the identified address corresponds to the common network ID and does not correspond to the individual node ID.

8. The node according to claim 7, wherein reception is terminated for a length of time corresponding to a data length of a frame of the current packet, and the evaluation circuit is further configured to cause the receiving circuit to continue reception of at least a portion of a subsequent packet after the length of time expires.

9. The node according to claim 8, wherein the length of time is determined based at least in part on a transmission time of an acknowledgment to be transmitted by the node.

10. The node according to claim 8, wherein the length of time is limited by a maximum value.

11. A system comprising:
a radio network operable to transmit packets to a plurality of network nodes', and
a network node having a network ID and a node ID, the network node configured to:
receive a first portion of a current packet;
examine the first portion of the current packet to identify an address contained in the current packet;
continue to receive a second portion of the current packet if the identified address corresponds to the network ID of the node and the node ID of the node;
terminate the reception of the second portion of the current packet if the identified address does not correspond to the network ID of the node or the node ID of the node; and
in response to determining that the identified address does not correspond to the network ID of the node:
clear one or more synchronization parameters of the receiving circuit;
synchronize the receiving circuit to a new preamble;
determine a current reception energy of the current packet; and
based at least on the determined current reception energy, determine one or more of an upper threshold and a lower threshold,
wherein synchronizing the receiving circuit to the new preamble is initiated if the current reception energy in the transmission channel exceeds the upper threshold or falls below the lower threshold.

12. The system according to claim 11, wherein the network node is further configured to terminate the reception of the second portion of the current packet if the identified address corresponds to the common network ID and does not correspond to the individual node ID.

13. The system according to claim 11, wherein reception is terminated for a length of time corresponding to a data length of a frame of the current packet, and the network node is further configured to continue reception of at least a portion of a subsequent packet after the length of time expires.

14. The system according to claim 11, wherein the length of time is determined based at least in part on a transmission time of an acknowledgment to be transmitted by the node.

15. The system according to claim 11, wherein the length of time is limited by a maximum value.

* * * * *

UNITED STATES PATENT AND TRADEMARK OFFICE
CERTIFICATE OF CORRECTION

PATENT NO. : 8,615,012 B2  
APPLICATION NO. : 12/818907  
DATED : December 24, 2013  
INVENTOR(S) : Tilo Ferchland et al.

Page 1 of 1

It is certified that error appears in the above-identified patent and that said Letters Patent is hereby corrected as shown below:

In the Claims

Col. 8, Ln. 43: After "nodes" and before "and" delete """ and "," and insert --;--.

Signed and Sealed this
Fourteenth Day of October, 2014

Michelle K. Lee
*Deputy Director of the United States Patent and Trademark Office*